(12) United States Patent
Warmerdam et al.

(10) Patent No.: US 6,609,333 B2
(45) Date of Patent: Aug. 26, 2003

(54) PLANT SUPPORT AND CONTAINER LIFTING DEVICES

(75) Inventors: Oscar Warmerdam, Alpharetta, GA (US); Adrian P. van de Gutche, Grand Lodge, MI (US)

(73) Assignee: Superior Plant & Bulb, Roswell, GA (US)

( * ) Notice: Subject to any disclaimer, the term of this patent is extended or adjusted under 35 U.S.C. 154(b) by 0 days.

(21) Appl. No.: 09/728,598

(22) Filed: Dec. 1, 2000

(65) Prior Publication Data

US 2001/0029698 A1 Oct. 18, 2001

Related U.S. Application Data

(60) Provisional application No. 60/168,401, filed on Dec. 1, 1999.

(51) Int. Cl.[7] .......................... A01G 17/06; A01G 9/12
(52) U.S. Cl. .............................................. 47/47; 47/70
(58) Field of Search ........................... 47/70, 44, 45, 47/47

(56) References Cited

U.S. PATENT DOCUMENTS

| 500,140 A | | 6/1893 | Krüger | |
|---|---|---|---|---|
| RE11,622 E | | 7/1897 | Warren et al. | |
| 597,841 A | * | 1/1898 | Dolf | 47/47 |
| 796,214 A | | 8/1905 | Hughes | |
| 1,664,436 A | | 4/1928 | Tonnesen | |
| 2,000,911 A | | 5/1935 | Balousek | |
| 2,083,678 A | * | 6/1937 | Wilson | 47/47 |
| 2,770,919 A | * | 11/1956 | Shumaker | 47/39 |
| 2,817,190 A | | 12/1957 | Matson | |
| 3,076,289 A | * | 2/1963 | Gallo | 47/83 |
| 3,605,336 A | * | 9/1971 | Meisler | 47/45 |
| 4,040,208 A | | 8/1977 | England | |
| 4,631,861 A | | 12/1986 | Wuthrich | |
| D305,800 S | | 1/1990 | Mottmiller et al. | |
| 4,914,857 A | * | 4/1990 | Dodgen | 47/47 |
| 5,159,780 A | | 11/1992 | Molthen | |
| 5,425,203 A | * | 6/1995 | Scott | 47/70 |
| 5,542,209 A | | 8/1996 | Sheu | |
| 5,542,210 A | | 8/1996 | Hupfl | |
| 5,778,597 A | | 7/1998 | Klevstad | |

FOREIGN PATENT DOCUMENTS

| GB | 212755 | | 3/1924 | |
|---|---|---|---|---|
| JP | 117600 A | * | 5/1998 | A01G/9/12 |
| JP | 312535 A | * | 11/2000 | A01G/9/02 |

* cited by examiner

Primary Examiner—Peter M. Poon
Assistant Examiner—Son T. Nguyen
(74) Attorney, Agent, or Firm—Kilpatrick Stockton LLP

(57) ABSTRACT

A detachable container lifting device includes a handle with first and second longitudinal members extending from the handle. Each longitudinal member has an end section. A first aperture engaging structure is positioned on the end section of the first longitudinal member while a second aperture engaging structure is positioned on the end section of the second longitudinal member. A first stabilizing extension is positioned along the first longitudinal member between the handle and the first aperture engaging structure. A second stabilizing extension is positioned along the longitudinal member between the handle and the second aperture engaging structure. The stabilizing extensions and the longitudinal members enclose an edge region of a container adjacent to a main opening of the container while the aperture engaging structures pass through apertures adjacent to a region of the container spaced from the main opening. The stabilizing extensions and the aperture engaging structures increase a number of contact points with the container to increase structural rigidity of the container lifting device.

38 Claims, 5 Drawing Sheets

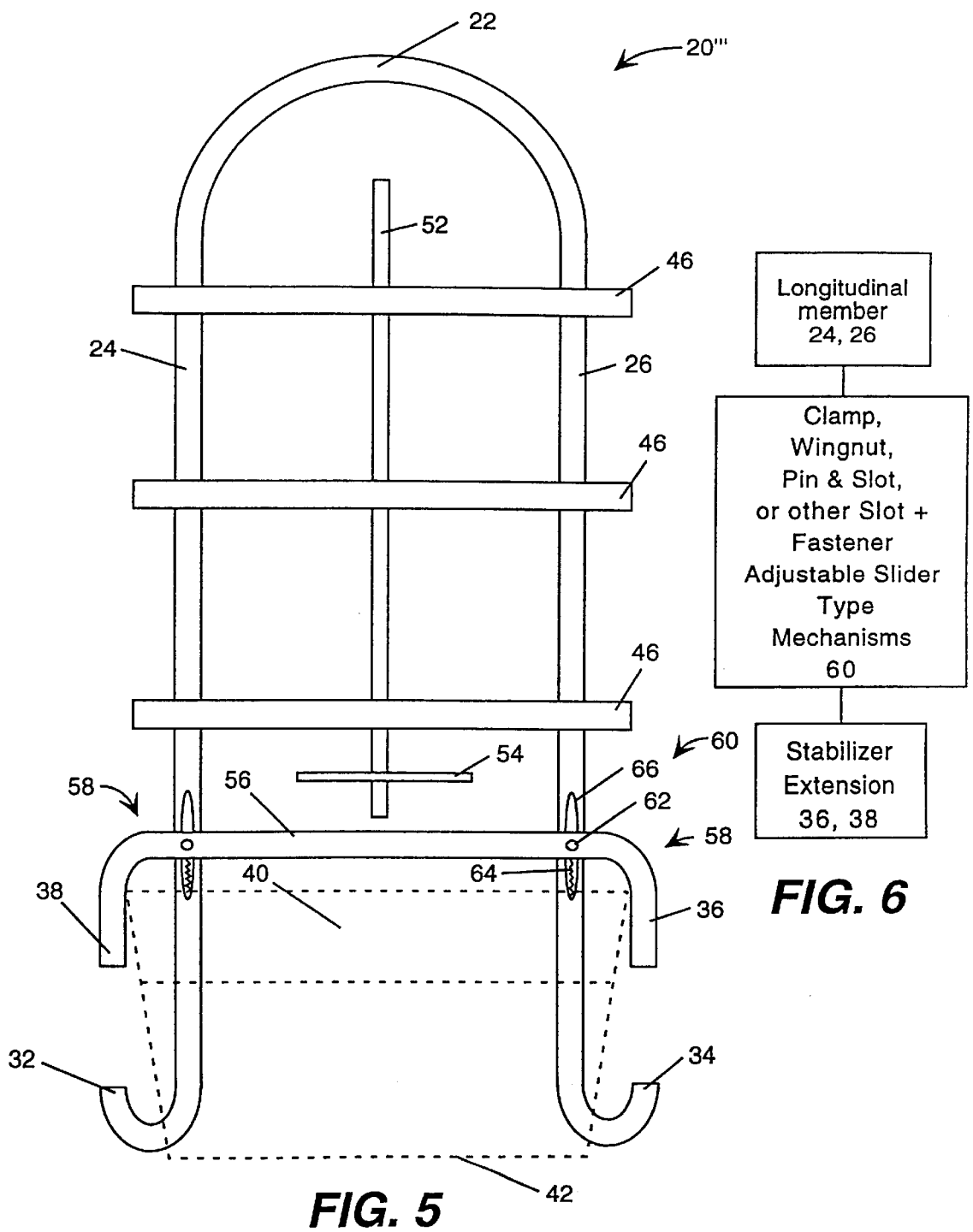

PLANT SUPPORT AND CONTAINER LIFTING DEVICES

This patent application claims priority to provisional application No. 60/168,401, filed on Dec. 1, 1999.

TECHNICAL FIELD

The present invention relates generally to methods and devices for lifting a container and relates more specifically to a detachable handle that also provides support for plants growing in a container.

BACKGROUND OF THE INVENTION

Many container lifting devices are designed to support containers by grasping or clamping an upper edge region of the container that is adjacent to the main aperture of the container. Such mechanisms are rather complex and require a substantial amount of clamping or gripping force on this upper edge region in order to support the weight of the container. The conventional container lifting devices are likely to slip or disengage from the upper edge region of container if they are subjected to abrupt or sudden lateral forces applied to the lifting device. If a container is elevated during the application of such lateral forces, the container lifting device could release its container and the container could be damaged as a result of a fall.

While a container lifting device may slip or inadvertently release a container due to sudden lateral forces, conventional container lifting devices may also inadvertently release the container due to excessive weight of the material disposed within the container. For example, when a container includes soil and a plant disposed within the soil, a container lifting device could release an upper edge region of the container due to the excessive weight created by the plant and its respective soil. Further, excessive weight is also created when water is added to the soil in the plant container. Some conventional container lifting devices are also designed to function as a trellis or a structure or frame of lattice work that supports climbing plants. However, such trellis type lifting devices focus more on the esthetic features and plant supporting function as opposed to properly securing the container so that the container is easily lifted without the inadvertent or sudden release of the container.

Thus there is need for container lifting devices that provide rigid support of a container when subjected to abrupt lateral forces or when the container is filled with dense material such as potting soil and plants or the like. There is a further need for a container lifting device that can support growing plants while having an increased contact area with the container in order to provide more rigid support thereof.

SUMMARY OF THE INVENTION

The present invention overcomes the problems associated with conventional lifting devices which have inherent limitations based upon their intended gripping or clamping region of a container. The container lifting device of the present invention increases the number of contact points with a container without requiring a rather complex mechanical structure. The present invention contacts an edge region of a container in addition to apertures already existing in the container. Consequently, the complexity and inadvertent release of containers associated with conventional container lifting devices are substantially eliminated by the present invention. Further, the container lifting device of the present invention has the capability of rigidly supporting a container while facilitating proper plant growth of plants disposed within the soil of the container. In other words, the present invention serves as a trellis to foster growth of a plant such that breakage or bowing of a plant is substantially eliminated. The container lifting device of the present invention provides rigid support of the container while being readily detachable from the container.

Stated more specifically, the present invention relates generally to container lifting devices employing a handle, stabilizing extensions, and aperture engaging structures. The container lifting devices of the present invention comprise a handle and first and second longitudinal members extending from the handle. Each longitudinal member includes an end section where an aperture engaging structure is positioned. The container lifting device further includes stabilizing extensions that are positioned along respective longitudinal members between the handle and the aperture engaging structures. The stabilizing extensions and the longitudinal members enclose an edge region of the container adjacent to a main opening of the container while the aperture engaging structures pass through existing apertures adjacent to the bottom of the container or a region of the container spaced from a main opening.

To enclose the edge region of a container, each stabilizing extension can have a substantially J-shape. Similarly, in order to readily engage existing apertures of a container, each aperture engaging structure can have a substantially J-shape. Due to the relative positioning of the aperture engaging structures and the stabilizing extensions of the container lifting device and when each has a substantially J-shape, the mechanisms face each other in such a manner to form a substantially C-shape for increasing the number of contact points with the container.

In order to increase portability and facilitate attaching and detaching of the container lifting device, the container lifting device of the present invention is flexible such that each longitudinal member is capable of being moved towards an opposing longitudinal member. Such a feature permits the aperture engaging structures to pass through and lock into apertures of containers having various diameters. In order words, the container lifting device can adapt to many different containers having multiple sizes or shapes or both.

Similar to the flexibility of the longitudinal members, each stabilizing structure is movable relative to a respective longitudinal member. In one aspect of the present invention, each stabilizing structure is movable relative to a respective longitudinal member such that the stabilizing structure can adjust for various thicknesses of edge regions of a container. In another aspect of the present invention, each stabilizing extension is slideable along a respective longitudinal member in order to adjust to a height of a container. To facilitate movement of each stabilizing extension outwardly relative to a longitudinal member, each stabilizing extension can include a spring section. Each spring section can include a coil spring or a region designed to flex in response to a predetermined amount of force. In one preferred embodiment of the present invention, the container is a plant container and the apertures disposed within the container are water drain holes. While the container lifting device of the present invention is adjustable to containers of various sizes, shapes, thicknesses, etc., the container lifting device can include cross members connecting the longitudinal members together. The cross members are capable of supporting additional longitudinal members or plants that are disposed within the container. Each cross member can be connected to respective longitudinal member by a spot weld.

In yet another aspect of the present invention, a method for moving a plant container with a detachable handle includes flexing at least two end members of the handle toward each other. The method further includes moving the flexed end members through material disposed within the plant container. Next, each flexed end of the handle is guided towards an aperture of the plant container. Each end member is released such that each end member passes through a respective aperture. Next, the stabilizing extensions are engaged with sides of the plant container. A force is then applied to the handle such that each end member contacts a side of a respective aperture within the container.

Thus, it is the object of the present invention to provide an improved container lifting device.

It is another object of the present invention to provide a container lifting device that provides rigid support of a container but is also capable of adjusting to containers of various sizes and without complex grasping or clamping mechanisms. A further object of the present invention is to provide a container lifting device that also facilitates the proper growth of plants such that breakage or bowing thereof is substantially reduced or eliminated.

That the invention improves over the conventional container lifting devices and accomplishes the advantages described above will become apparent in the following detailed description of the exemplary embodiments and the appended drawings and claims.

BRIEF DESCRIPTION OF THE DRAWINGS

FIG. 5 is a front view of a container lifting device according to a further embodiment of the present invention, where each stabilizing extension is slideable relative to a respective longitudinal member.

FIG. 6 is a functional block diagram illustrating possible alternate embodiments for the adjustable slider type mechanisms that can facilitate movement of the stabilizer extension relative to a respective longitudinal member.

DETAILED DESCRIPTION OF EXEMPLARY EMBODIMENTS

Figures 1, 2:
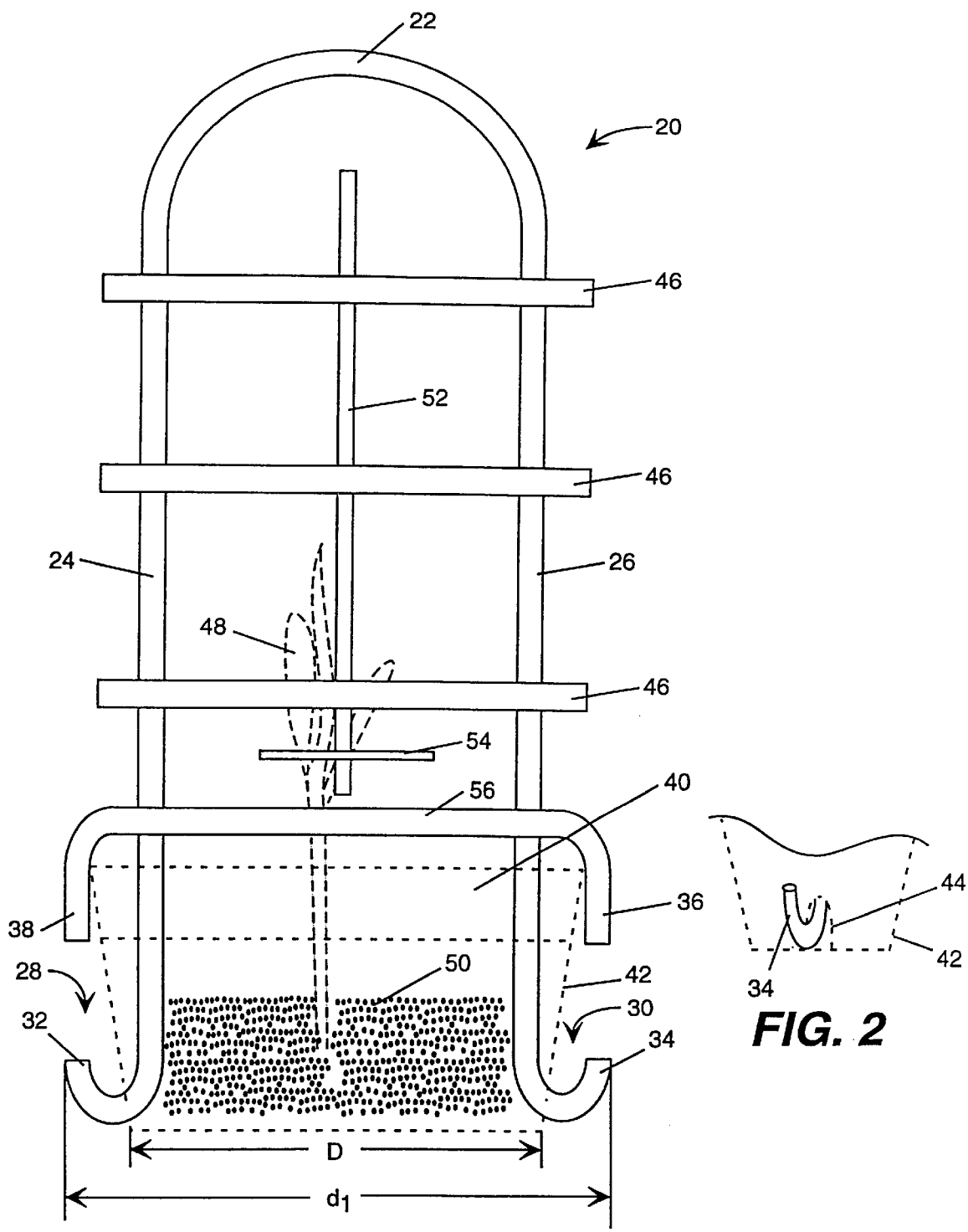
FIG. 1 is a front view of a container lifting device according to one embodiment of the present invention.
FIG. 2 is a partial side view of an aperture engaging structure of the present invention.

Referring now to the drawings in which like numerals indicate like elements throughout the several views, FIG. 1 is a front view of an embodiment of a container lifting device 20 of the present invention. The container lifting device 20 includes a U-shaped handle 22 and first and second longitudinal members 24, 26 extending therefrom. The U-shaped handle provides a grip that readily conforms to a human hand. However, other handles with different shapes, sizes, and configurations are not beyond the scope of the present invention.

Each longitudinal member 24, 26 includes a respective end section 28, 30. Each end section 28, 30 includes an aperture engaging structure 32 or 34. Each longitudinal member 24, 26 also includes a respective stabilizing extension 36 or 38. The stabilizing extensions 36, 38 are positioned along a respective longitudinal member 24 or 26 between the handle 22 and a respective aperture engaging structure 32, 34.

The stabilizing extensions 36, 38 and the longitudinal members 24, 26 enclose an edge region 40 of a container 42 illustrated in phantom. The stabilizing extensions 36, 38 provide increased resistance to any lateral forces that can be applied to the handle 22 or longitudinal members 24, 26.

Similar to the stabilizing extensions 36, 38, the aperture engaging structures 32, 34 increase the rigidity or grasping ability of the container lifting device by passing through and locking into apertures 44. This locking capability is attributed to the flexibility of the longitudinal members 24, 26 relative to each other. In other words, the container lifting device 20 of the present invention is made from a material such that the longitudinal members 24 and 26 can be flexed inwardly towards each other in order to accommodate containers 42 of various sizes and shapes where the apertures 44 are spaced apart in accordance with the respective size or shape of the container 42. The container lifting device 20 is designed such that the longitudinal members 24, 26 will expand outwardly so that the aperture engaging structures 32, 34 will pass through the respective apertures 44.

Each aperture engaging structure 32, 34 is spaced apart from a respective aperture engaging structure by a predetermined distance $d_1$. This predefined distance $d_1$ is designed such that it is substantially equal to or greater than the diameter D of the container 42 after inserting the aperture engaging structures 32, 34 into the container 42. The container 42 is preferably a plant container and the apertures 44 are preferably pre-existing waterholes 44 in the plant container 42. However, other apertures such as pre-existing or preformed holes designed for hanging the container are not beyond the scope of the present invention.

To facilitate the flexing of the longitudinal members 24, 26 of the container lifting 20, the container lifting device 20 can be made from pliable materials such as metal or plastic. For example, the containing lifting device 20 of the present invention can be made of a ferrous alloy such as steel, a non-ferrous alloy such as aluminum or titanium, or polymers such as thermoplastics. However, the present invention is not limited to these materials and can include other materials such as ceramic materials, composite materials that can include wood, and other like materials.

To further facilitate flexing of the container lifting device 20 of the present invention, the handle 22, longitudinal members 24, 26, aperture engaging structures 32, 34, and stabilizing extensions 38, and 36 preferably have a substantially circular cross section. However, other cross sections are not beyond the scope of the present invention. Other possible cross sectional shapes include, but are not limited to, rectangular, octagonal, pentagonal, triangular, trapezoidal, and other like shapes. The shape and materials for the container lifting device 20 are chosen such that the longitudinal members 24, and 26 are flexible relative to each other when a lateral force is applied thereto, but in absence of such lateral forces, the longitudinal members 24, 26 remain in their predefined or preformed shape.

Increased Number of Contact Points With a Container

The container lifting device 20 of the present invention provides for an increased number of contact points with the container 42 through the aperture engaging structures 32, 34, and stabilizing extensions 36, 38. Each stabilizing extension 36, 38 and each aperture engaging structure 32, 34 has a predefined shape to provide this increased number of contact points with the container 42. In the preferred embodiment, the stabilizing extensions 36, 38 and the aperture engaging structures 32, 34 have a substantially similar predefined shape. One shape which facilitates locking of the aperture engaging structures 32, 34 with their respective aperture 44 is a J-shape. This J-shape also facilitates contact of the stabilizing extensions 36, 38 with the edge region 40 of the container 42.

In the preferred embodiment, each aperture engaging structure 32, 34 has substantially J-shape that faces a respective opposing stabilizing extension 36 or 38 that also has a substantially J-shape. Due to the relative positioning of the stabilizing extensions 36, 38 and aperture engaging structures 32, 34 and the shapes thereof, these structures form a substantially C-shape that increases the number of contact points of the container lifting device 20 with the container 42.

Spaced between the stabilizing extensions 38, 36 and the handle 22 are cross members 46. Each cross member 46 and the connecting cross member 56 are preferably spot welded to the longitudinal members 24, 26. However, other fastening mechanisms are not beyond the scope of the present invention. Other fastening mechanisms include, but are not limited to, rivets, bolts, screws, nails, and other like fastening devices.

The cross members 46 can support a plant 48 disposed within the container 42 and material 50 filling the container 42. The material 50 can be any one of air, water, mud, soil, sand, disintegrated rock, and add mixture or organic matter and soluble salts, and other materials. In addition to supporting the plant 48, the cross members 46 can also support a third longitudinal member 52 that is disposed parallel with respect to the first and second longitudinal members 24, 26. The third longitudinal member 52 preferably includes a tying device 54 that can fasten a portion of the plant 48 to the third longitudinal member 52. The longitudinal members 24, 26, cross members 46, third longitudinal member 52, and tying device 54 are designed to facilitate growth of the plant 48 such that breakage or bowing of the plant 48 is substantially eliminated. The longitudinal members 24, 26, cross members 46, and third longitudinal member 52 form a trellis structure for any plants 48 disposed within the container 42.

Figure 3:
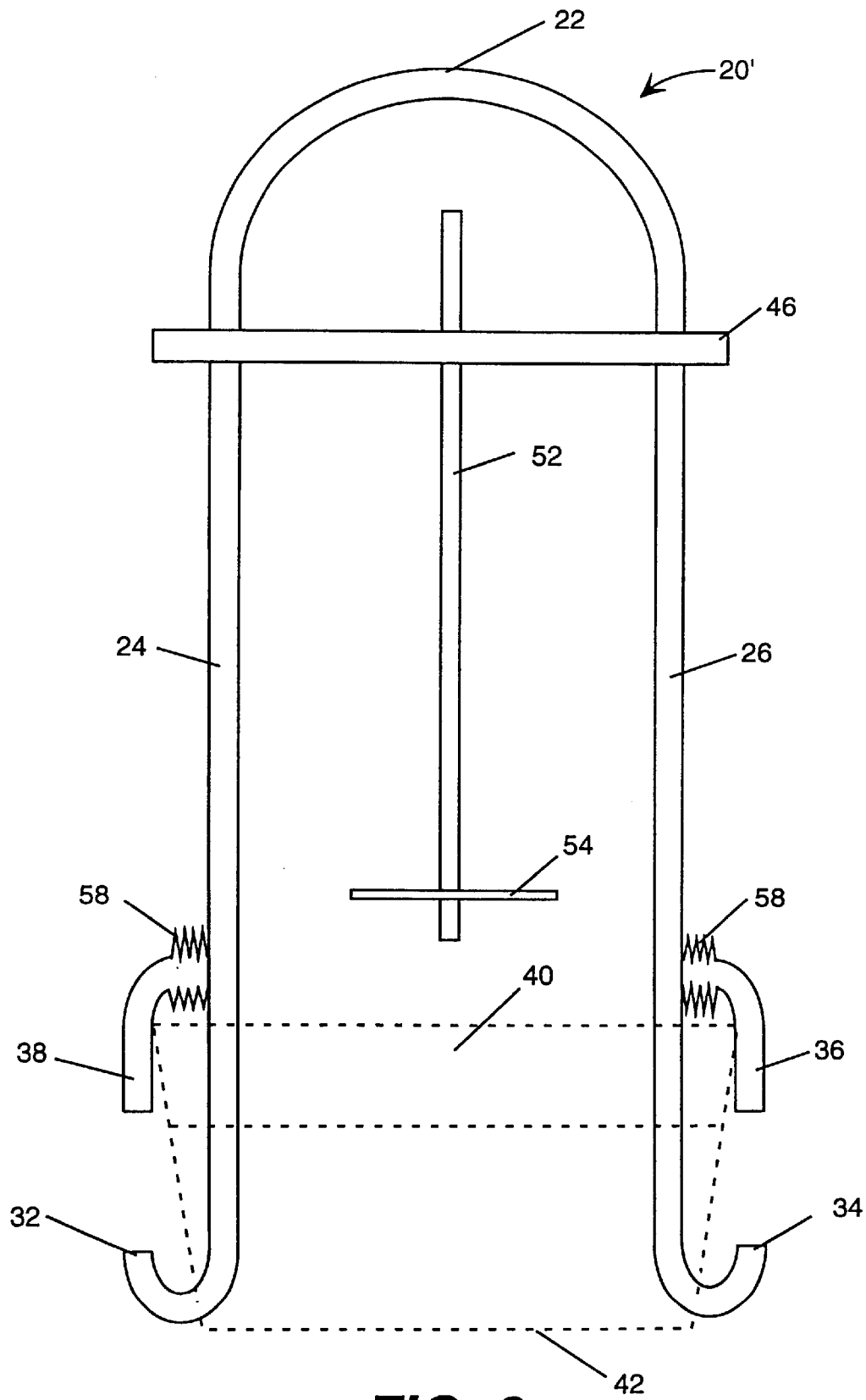
FIG. 3 is a front view of a container lifting device according to another embodiment of the present invention, where the stabilizing extensions include a coiled spring section.

In the embodiment illustrated in FIG. 1, the stabilizing extensions 36, 38 are fastened to one another by a connecting cross member 56. In this embodiment, the connecting cross member 56 and stabilizing extensions 38, 36 form a unitary structure. However, separate stabilizing extensions 36, 38 are not beyond the scope of the present invention. For example, as illustrated in FIG. 3, each stabilizing extension 36, 38 is separately secured to a respective longitudinal member 24, 26. The embodiment illustrated in FIG. 3, each stabilizing extension 36, 38 further includes a spring section 58 disposed between the extension 36, 38 and respective longitudinal member 24, 26. In the spring section 58 can be either an actual mechanical spring or a region designed to flex in response to a predetermined amount of force.

In FIG. 3, only one cross member 46 is illustrated to support the third longitudinal member 52. Increasing or decreasing the number of cross members 46 is dependent upon the type of plants 48 disposed within the container 42 and the anticipated amount of growth of the plants.

Figure 4:
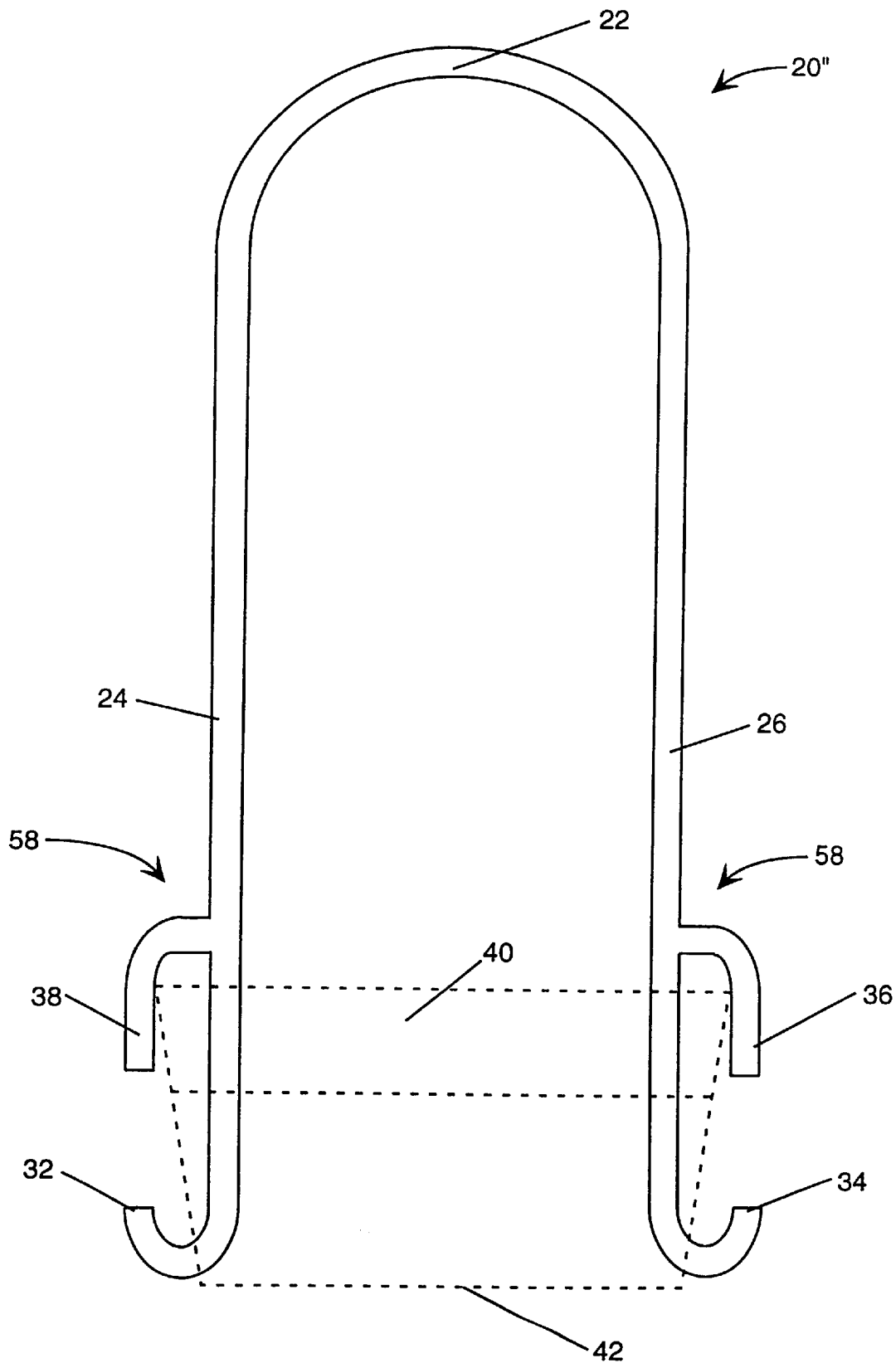
FIG. 4 is a front view of a container lifting device according to another embodiment of the present invention, where each stabilizing extension and a respective longitudinal member form a unitary structure.

For example, as illustrated in FIG. 4, cross members 46 and the connecting cross member 56 have been eliminated from this embodiment. In this embodiment, the container lifting device 20 can support plants 48 with first and second longitudinal members 24, 26. Also in this embodiment, the spring section 58 is preferably part of the stabilizing extensions 36, 38 where both structures form a unitary member. The spring section 58 can be made of materials such that the first and second stabilizing extensions 36, 38 are pliable and can be moved outwardly or inwardly relative to a respective longitudinal member 24, 26.

Height Adjustment Mechanism

As illustrated in FIG. 5, the container lifting device 20''' can further include slideable stabilizing extensions 36, 38 that move relative to each longitudinal member 24, 26. In one embodiment, the connecting cross member 56 can be attached to each longitudinal member 24, 26 by a spring biased pin-slot arrangement 60. In such an arrangement 60, a pin 62 is biased a spring 64 while the slot 66 contains the sliding movement of the pin 62. With such an arrangement, the container lifting device 20 can fit containers 42 having various diameters and heights or both.

While one embodiment provides the spring biased pin-slot arrangement 60, other types of sliding mechanisms are not beyond the scope of the present invention. For example, as illustrated in the functional block diagram of FIG. 6, each stabilizer extension 36, 38 can be fastened to a respective longitudinal member 24, 26 by either a clamp, bolt, wingnut arrangement, other types of pin and slots, and other adjustable slider type mechanisms. The present invention is not limited to the mechanical embodiments disclosed herein and can include other equivalent adjustable slider type mechanisms (not shown) that provide for adjustable stabilizer extensions 36, 38.

Figure 7:
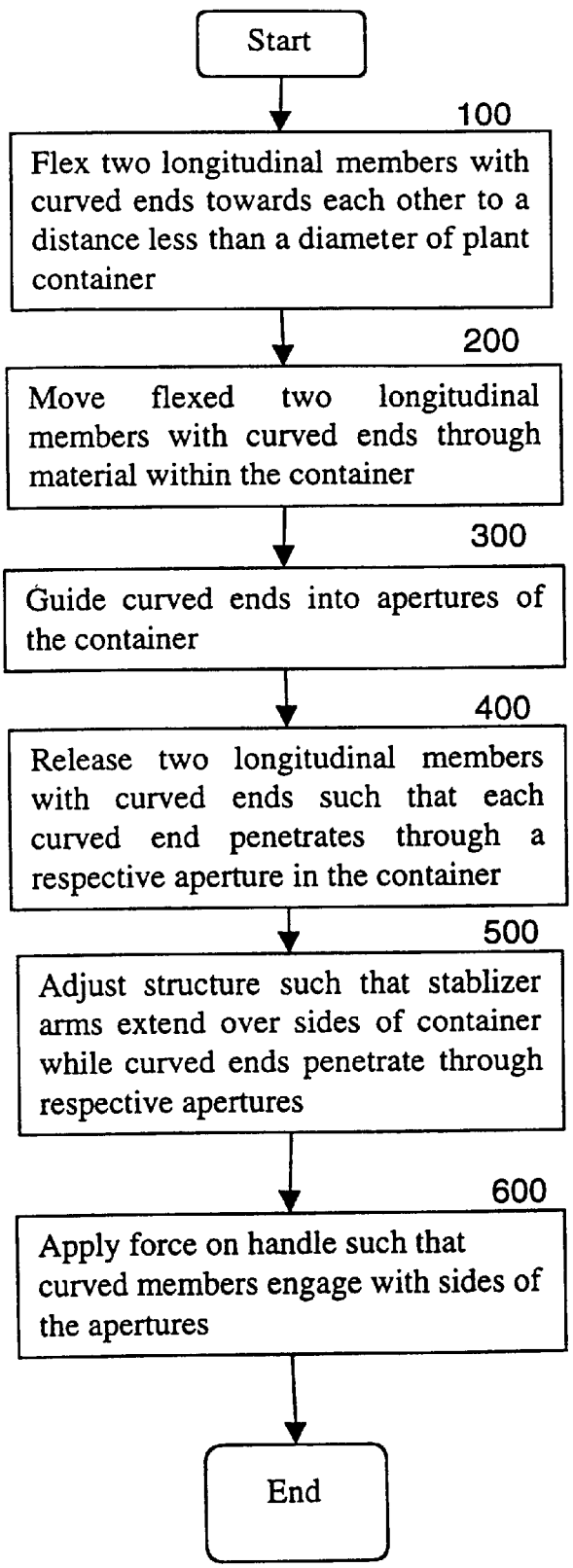
FIG. 7 is a logic flow diagram illustrating a method for moving a plant container.

Description of Operation of the Preferred Apparatus With Reference to the Logic Flow Diagram of FIG. 7

FIG. 7 is a logic flow diagram of the process of moving a plant container 42 with the detachable container lifting device 20 of the present invention. Step 100 in FIG. 7 is the first step of the process of moving a plant container 42 with the detachable container lifting device 20 of the present invention. In step 100, each of the longitudinal members 22, 24 having the curved ends or aperture engaging structures 32, 34 are moved through the material 50 within the container 42. Following step 200, in step 300 the curved ends or aperture engaging structures 32, 34 are guided into the apertures 44 of the plant container 42. In step 400, the longitudinal members 22, 24 having the curved ends or aperture engaging structures 32, 34 are released such that each curved end or aperture engaging structure 32, 34 penetrates through a respective aperture 44 in the plant container 42.

In step 500, the container lifting device 20 is adjusted such that the stabilizer arms or extensions 36, 38 extend over the sides of the container 42 while the curved ends or aperture engaging members 32, 34 penetrate through the respective apertures. In step 600, a force is applied to the handle 22 of the container lifting device 20 such that the curved members or aperture engaging structures 32, 34 contact or engage with sides of the apertures 44.

With the present invention, a stable yet relatively simple container lifting device is provided. The container lifting device 20 provides strong support for a container 42 while also providing a structure to facilitate plant growth of plants 48 disposed within the container 42.

Finally, it will be understood that the preferred embodiments have been disclosed by way of example and that other modifications may occur to those skilled in the art without departing from the scope and spirit of the appended claims.

What is claimed is:

1. An apparatus for use with a container, comprising:

a handle portion; and first and second longitudinal members extending downward from said handle portion in spaced apart relation, each of said longitudinal members having a lower hook member extending from a lower portion thereof, and each of said longitudinal members having an inverted upper hook member extending from a portion of said longitudinal member between said lower hook member and said handle portion and spaced apart therefrom;

wherein the inverted upper hook members are fixed relative to their respective longitudinal members;

wherein the inverted upper hook member has a height greater than the height of the respective lower hook member;

whereby said apparatus is capable of engaging a container comprising side walls having upper regions and lower portions with a plurality of apertures formed in said lower portions, by said lower hook members capable of engaging said apertures of said container such that said hook members each confront an edge of a corresponding aperture, and by said inverted upper hook members engaging upper regions of said container side walls, whereby said container is capable of being supported by said lower hook members confronting said edges of said apertures in said side walls of said container; and whereby said handle is capable of being stabilized with respect to said container by said upper hook members engaging said upper regions of said container side walls.

2. The apparatus of claim 1, wherein said lower hook members are substantially "J"-shaped.

3. The apparatus of claim 1, wherein said inverted upper hook members are shaped substantially like an inverted "J."

4. The apparatus of claim 1, wherein said lower hook members are substantially "J"-shaped;

wherein said inverted upper hook members are shaped substantially like an inverted "J"; and wherein said lower hook members and said inverted upper hook members are mutually opposed such that each pair of lower and inverted upper hook members forms a "C" shape.

5. The apparatus of claim 1, further comprising:

a cross member extending between said first and second longitudinal members and spaced upward from said lower hook members, whereby said cross member structurally reinforces said apparatus and, when used in conjunction with a container containing a potted plant planted in said container and extending upward therefrom, serves as a trellis member to support a portion of said potted plant.

6. The apparatus of claim 5, wherein said inverted upper hook members and said cross member are formed as a unitary structure.

7. The apparatus of claim 1, further comprising:

a third longitudinal member disposed between said first and second longitudinal members and substantially in a plane defined by said first and second longitudinal members, said third longitudinal member being connected to at least one of said handle portion, said first longitudinal member, and said second longitudinal members;

whereby when said apparatus is used in conjunction with a container containing a potted plant planted in said container and extending upward therefrom, said third longitudinal member serves as a trellis member to support a portion of said potted plant.

8. The apparatus of claim 7, further comprising a cross member extending between said first and second longitudinal members and spaced upward from said lower hook members, said third longitudinal member being attached to said cross member, and wherein said third longitudinal member is connected to said first and second longitudinal members by way of said cross member.

9. The apparatus of claim 1, wherein at least one of said handle portion, said first longitudinal member, and said second longitudinal member is flexible such that said longitudinal members are capable of being displaced relative to one another to facilitate coupling said longitudinal members to a container.

10. An apparatus for storing and transporting potted plants, comprising:

a container, said container including side walls having upper regions and lower portions with a plurality of drainage apertures formed in said lower portions, each of said drainage apertures having an edge;

a handle;

first and second longitudinal members disposed in spaced apart relation and extending downward from said handle toward said container, each of said longitudinal members having a lower portion;

first and second aperture engaging structures, said first aperture engaging structure connected to said lower portion of said first longitudinal member, and said second aperture engaging structure connected to said lower portion of said second longitudinal member, said aperture engaging structures being configured to extend through corresponding ones of said drainage apertures in said side walls so as to confront an edge of said aperture; and first and second stabilizing extensions, said first stabilizing extension being connected to said first longitudinal member at a location spaced upward from said first aperture engaging structure, and said second stabilizing extension being connected to said second longitudinal member at a location spaced upward from said second aperture engaging structure, said stabilizing extensions being configured to engage upper regions of said container side walls so as to constrain lateral movement of said longitudinal members with respect to said container;

wherein the first and second stabilizing extensions are in fixed positions relative to the respective first and second longitudinal members;

wherein the first stabilizing extension has a height greater than the height of the respective first aperture engaging structure, and the second stabilizing extension has a height greater than the height of the respective second aperture engaging structure;

whereby said container can be carried by said handle; and whereby said longitudinal members serve as a trellis to support a portion of a potted plant planted in said container and extending upward therefrom.

11. The plant storage and transportation apparatus of claim 10, wherein each of said first and second aperture engaging structures is substantially "J"-shaped.

12. The plant storage and transportation apparatus of claims 10, wherein each of said first and second stabilizing extensions is shaped substantially like an inverted "J."

13. The plant storage and transportation apparatus of claim 10,
   wherein each of said first and second aperture engaging structures is substantially "J"-shaped;
   wherein each of said first and second stabilizing extensions is shaped substantially like an inverted "J"; and
   wherein said first and second aperture engaging structures and said first and second stabilizing extensions are mutually opposed such that each of said substantially J-shaped aperture engaging structures and a corresponding one of said inverted substantially J-shaped stabilizing extensions form a "C" shape.

14. The plant storage and transportation apparatus of claim 10, further comprising:
   a cross member attached to and extending between said first and second longitudinal members and spaced upward from said container,
   whereby said cross member structurally reinforces said apparatus and serves as an additional trellis member to support a portion of a plant planted in said container and extending upward therefrom.

15. The plant storage and transportation apparatus of claim 14, wherein said first and second stabilizing extensions and said cross member are formed as a unitary structure.

16. The plant storage and transportation apparatus of claim 10, further comprising:
   a third longitudinal member disposed between said first and second longitudinal members and substantially in a plane defined by said first and second longitudinal members, said third longitudinal member being connected to at least one of said handle member, said first longitudinal member, and said second longitudinal member;
   whereby when a potted plant is planted in said container and extends upward therefrom, said third longitudinal member serves as an additional trellis member to support a portion of said plant.

17. The plant storage and transportation apparatus of claim 16, wherein said apparatus further comprises a cross member attached to and extending between said first and second longitudinal members and spaced upward from said container, wherein said third longitudinal member is attached to said cross member, and wherein said third longitudinal member is connected to said first longitudinal member and said second longitudinal member by way of said cross member.

18. The plant storage and transportation apparatus of claim 10, wherein at least one of said handle, said first longitudinal member, and said second longitudinal member is flexible such that said longitudinal members are capable of being displaced relative to one another to facilitate coupling said longitudinal members to said container.

19. The plant storage and transportation apparatus of claim 10, wherein said container has a maximum diameter, and wherein said first and second longitudinal members are normally spaced apart by a distance substantially corresponding to said maximum diameter of said container.

20. An apparatus for use with a container, comprising:
   a handle portion; and
   first and second longitudinal members extending downward from said handle portion in spaced apart relation, each of said longitudinal members having a lower hook member extending from a lower portion thereof, and each of said longitudinal members having an inverted upper hook member extending from a portion of said longitudinal member between said lower hook member and said handle portion and spaced apart therefrom;
   wherein the inverted upper hook member has a height greater than the height of the respective lower hook member;
   whereby said apparatus is capable of engaging a container comprising side walls having upper regions and lower portions with a plurality of apertures formed in said lower portions, by said lower hook members capable of engaging said apertures of said container such that said hook members each confront an edge of a corresponding aperture, and by said inverted upper hook members engaging upper regions of said container side walls,
   whereby said container is capable of being supported by said lower hook members confronting said edge of said apertures in said side walls of said container; and
   whereby said handle is capable of being stabilized with respect to said container by said upper hook members engaging said upper regions of said container side walls.

21. The apparatus of claim 20, wherein said lower hook members are substantially "J"-shaped.

22. The apparatus of claim 20, wherein said inverted upper hook members are shaped substantially like an inverted "J".

23. The apparatus of claim 20, wherein said lower hook members are substantially "J"-shaped;
   wherein said inverted upper hook members are shaped substantially like an inverted "J"; and
   wherein said lower hook members and said inverted upper hook members are mutually opposed such that each pair of lower and inverted upper hook members forms a "C" shape.

24. The apparatus of claim 20, further comprising:
   a cross member extending between said first and second longitudinal members and spaced upward from said lower hook members,
   whereby said cross member structurally reinforces said apparatus and, when used in conjunction with a container containing a potted plant planted in said container and extending upward therefrom, serves as a trellis member to support a portion of said potted plant.

25. The apparatus of claim 24, wherein said inverted upper hook members and said cross member are formed as a unitary structure.

26. The apparatus of claim 20, further comprising:
   a third longitudinal member disposed between said first and second longitudinal members and substantially in a plane defined by said first and second longitudinal members, said third longitudinal member being connected to at least one of said handle portion, said first longitudinal member, and said second longitudinal member;
   whereby when said apparatus is used in conjunction with a container containing a potted plant planted in said container and extending upward therefrom, said third longitudinal member serves as a trellis member to support a portion of said potted plant.

27. The apparatus of claim 26, further comprising a cross member extending between said first and second longitudinal members and spaced upward from said lower hook members, said third longitudinal member being attached to said cross member, and wherein said third longitudinal member is connected to said first and second longitudinal members by way of said cross member.

28. The apparatus of claim 20, wherein at least one of said handle portion, said first longitudinal member, and said second longitudinal member is flexible such that said longitudinal members are capable of being displaced relative to one another to facilitate coupling said longitudinal members to a container.

29. An apparatus for storing and transporting potted plants, comprising:
   a container, said container including side walls having upper regions and lower portions with a plurality of drainage apertures formed in said lower portions, each of said drainage apertures having and edge;
   a handle;
   first and second longitudinal members disposed in spaced apart relation and extending downward from said handle toward said container, each of said longitudinal members having a lower portion;
   first and second aperture engaging structures, said first aperture engaging structure connected to said lower portion of said first longitudinal member, and said second aperture engaging structure connected to said lower portion of said second longitudinal member, said aperture engaging structures being configured to extend through corresponding ones of said drainage apertures in said side walls so as to confront an edge of said aperture; and
   first and second stabilizing extensions, said first stabilizing extension being connected to said first longitudinal member at a location spaced upward from said first aperture engaging structure, and said second stabilizing extension being connected to said second longitudinal member at a location spaced upward from said second aperture engaging structure, said stabilizing extensions being configured to engage upper regions of said container side walls so as to constrain lateral movement of said longitudinal members with respect to said container;
   wherein the first stabilizing extension has a height greater than the height of the respective first aperture engaging structure, and the second stabilizing extension has a height greater than the height of the respective second aperture engaging structure;
   whereby said container can be carried by said handle; and
   whereby said longitudinal members serve as a trellis to support a portion of a potted plant planted in said container and extending upward therefrom.

30. The apparatus of claim 29, wherein each of said first and second aperture engaging structures is substantially "J"-shaped.

31. The apparatus of claim 29, wherein each of said first and second stabilizing extensions is shaped substantially like and inverted "J".

32. The apparatus of claim 29,
   wherein each of said first and second aperture engaging structures is substantially "J"-shaped;
   wherein each of said first and second stabilizing extensions is shaped substantially like an inverted "J"; and
   wherein said first and second aperture engaging structures and said first and second stabilizing extensions are mutually opposed such that each of said substantially J-shaped aperture engaging structures and a corresponding one of said inverted substantially J- shaped stabilizing extensions form a "C" shape.

33. The apparatus of claim 29, further comprising:
   a cross member attached to and extending between said first and second longitudinal members and spaced upward from said container,
   whereby said cross member structurally reinforces said apparatus and serves as an additional trellis member to support a portion of a plant planted in said container and extending upward therefrom.

34. The apparatus of claim 33, wherein said first and second stabilizing extensions and said cross members are formed as a unitary structure.

35. The apparatus of claim 29, further comprising:
   a third longitudinal member disposed between said first and second longitudinal members and substantially in a plane defined by said first and second longitudinal members, said third longitudinal member being connected to at least one of said handle member, said first longitudinal member, and said second longitudinal member;
   whereby when a potted plant is planted in said container and extends upward therefrom, said third longitudinal member serves as an additional trellis member to support a portion of said plant.

36. The apparatus of claim 35, wherein said apparatus further comprises a cross member attached to and extending between said first and second longitudinal members and spaced upward from said container, wherein said third longitudinal member is attached to said cross member, and wherein said third longitudinal member is connected to said first longitudinal member and said second longitudinal member by way of said cross member.

37. The apparatus of claim 29, wherein at least one of said handle, said first longitudinal member, and said second longitudinal member is flexible such that said longitudinal members are capable of being displaced relative to one another to facilitate coupling said longitudinal members to said container.

38. The apparatus of claim 29, wherein said container has a maximum diameter, and wherein said first and second longitudinal members are normally spaced apart by a distance substantially corresponding to said maximum diameter of said container.

* * * * *